United States Patent

Nakanishi

[11] Patent Number: 5,818,823
[45] Date of Patent: Oct. 6, 1998

[54] SLOT ASSIGN SYSTEM WITH EACH PERIPHERAL STATION PRE-ASSIGNED

[75] Inventor: Hiroaki Nakanishi, Tokyo, Japan

[73] Assignee: NEC Corporation, Tokyo, Japan

[21] Appl. No.: 612,002

[22] Filed: Mar. 5, 1996

[30] Foreign Application Priority Data

Mar. 11, 1995 [JP] Japan .................................... 7-079648

[51] Int. Cl.$^6$ ....................................................... H04J 1/16
[52] U.S. Cl. .......................................... 370/322; 370/422
[58] Field of Search ................................... 370/321, 322, 370/324, 326, 336, 337, 347, 348, 443, 458, 459, 461, 310, 345, 442, 431, 464, 468, 447

[56] References Cited

U.S. PATENT DOCUMENTS

| | | | |
|---|---|---|---|
| 4,694,453 | 9/1987 | Kobayashi et al. | 370/249 |
| 4,736,371 | 4/1988 | Tejima et al. | 370/236 |
| 4,947,451 | 8/1990 | Nawata | 455/8 |

FOREIGN PATENT DOCUMENTS

2-010926  1/1990  Japan ................................ H04B 7/26

*Primary Examiner*—Dang Ton
*Attorney, Agent, or Firm*—Young & Thompson

[57] ABSTRACT

A slot assign system has a central station and a plurality of peripheral stations, and the communication between them is made through an artificial satellite. The central station stores pre-assign slot information of each of the peripheral stations, and multiplexes slot assign information to be changed at a next frame over the pre-assign slot information. The peripheral station, on receipt of the slot assign information, transmits the next frame using a slot assigned to itself. The central station sends a vacant slot with no pre-assignment as a non-assign information signal, and the peripheral station recognizing the vacant slot transmits, using the slot assigned to itself, a reservation request for using the vacant slot. The central station transmits a frame next to the frame to which the slot has been assigned. Thus, the slot assign information is centrally controlled by the central station and can be changed without a need for cutting off the data link between the central station and the peripheral stations.

4 Claims, 6 Drawing Sheets

SLOT ASSIGN SYSTEM WITH EACH PERIPHERAL STATION PRE-ASSIGNED

BACKGROUND OF THE INVENTION

(1) Field of the Invention

The present invention relates to a slot assign system in which, in a star type satellite communication network constituted by a central station and a plurality of peripheral stations, a line is time-divided into a plurality of slots for being assigned to individual peripheral stations, and more particularly to a slot assign system in which each peripheral station is provided with a pre-assign slot (PA slot) for its fixed use.

(2) Description of the Related Art

Generally, in the slot assignment in the satellite network constituted by the central station and a plurality of peripheral stations, one line is used in common by the peripheral stations in order to increase the line efficiency thereof. In the case where the PA slot is provided to each peripheral station for pre-assigned use, the amount of transmission per unit time can be increased because, unlike in a random access system which allows free communication among the peripheral stations, there is no damage of data caused by communication collision. An example of such a pre-assign system has been disclosed in Japanese Patent Application Kokai Publication No. Hei 2-10926.

Figure 1:
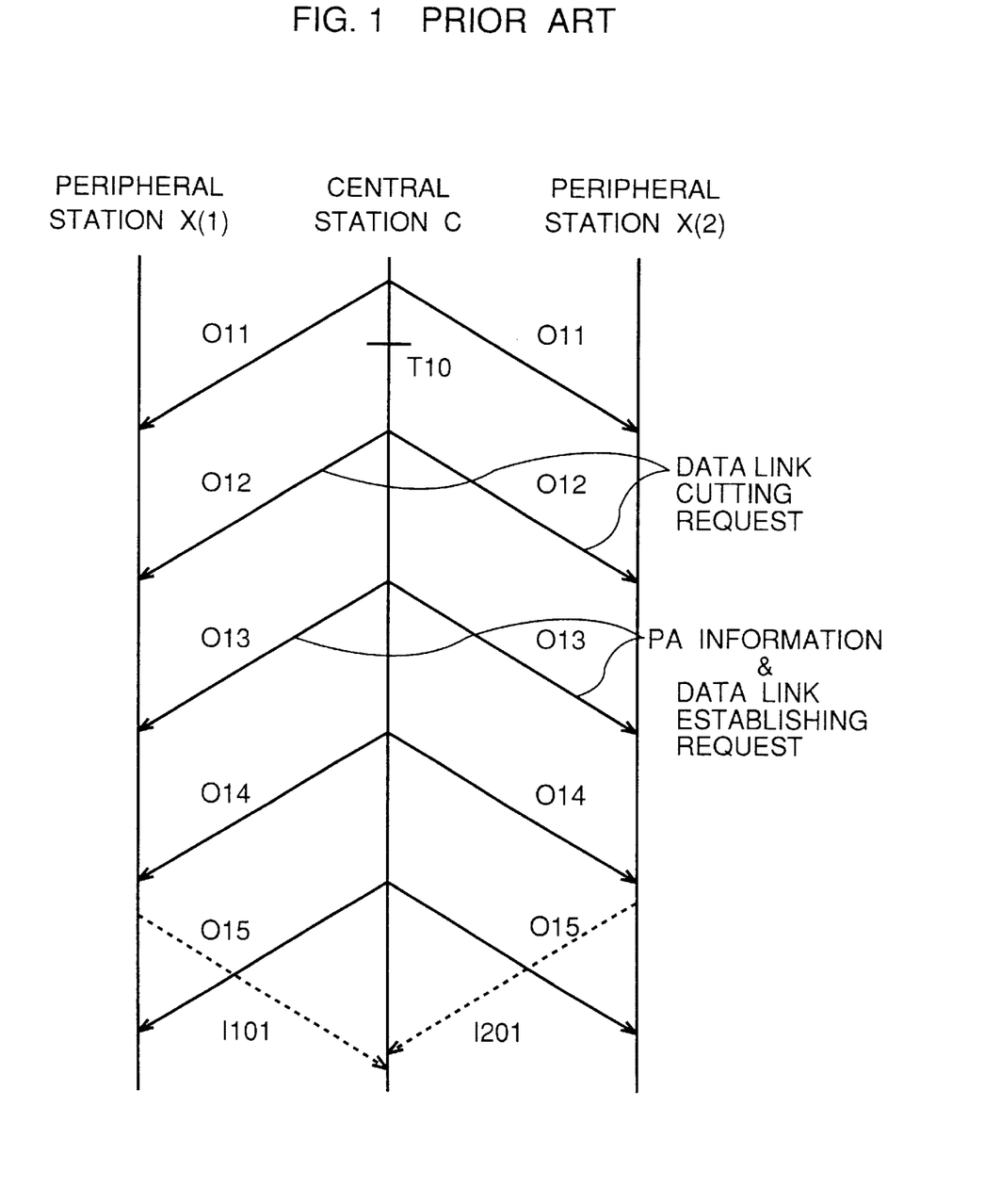
FIG. 1 is a timing chart showing a communication procedure using a conventional pre-assign system.

The communication procedure in the system disclosed in the above publication is shown in FIG. 1. The transmission signals (outbound signals) 011–015 from the central station to peripheral stations are transmitted in fixed intervals called frames. The frames and slots are cyclically numbered with the frame numbers being 0–n and the slot numbers being 0–m (n, m being natural number). Each of the peripheral stations X carries out the slot synchronization based on cycles of outbound signals.

Now, it is assumed that, at timing T10, the pre-assign information is changed at the central station C. Then, with the outbound signal 012, a request is made for the data link that had been in existence to be cut off once, and thus the data link is cut off. Subsequently, with the outbound signal 013, a request is made for establishing the data link with the changed pre-assign information (PA information). This PA information is stored at each peripheral station and, at the timing that is assigned to its station, the transmission I101, I201 is carried out.

In the conventional pre-assign slot (PA slot) system explained above, one problem is that the change in the pre-assign information always necessitates the cutting-off of the data link. This is necessary because, in such a system, there is a time difference from the time when the pre-assign change information is transmitted until the time when the change is completed after this pre-assign change information has been received by each peripheral station with such a time difference being different from a station to station, and there is a high probability for collision to occur if peripheral stations are to communicate while the change is taking place.

A further problem is that, when a peripheral station sends a large volume of data, the delay time for transmission will become extended. That is, since the peripheral station can use only its own PA slot, it is forced to wait for a long time for its turn to come to send out a desired volume of data. However, the prior art system does not allow an increase in slots for accepting a request for making reservation for temporary assignments at peripheral stations.

SUMMARY OF THE INVENTION

An object of the present invention, therefore, is to overcome the problems existing in the prior art, and to provide a slot assign system which enables the necessary change in the PA information without the need for cutting-off the data link.

A further object of the present invention is to provide a slot assign system which enables the reduction of a transmission delay time thereby enhancing a slot efficiency.

According to one aspect of the invention, there is provided a slot assign system for a communication network constituted by a central station and a plurality of peripheral stations, in which, through an artificial satellite, a communication from the central station to the peripheral stations is made in a broadcasting form, a communication from the peripheral stations to the central station is made through a line time-divided into a plurality of slots and a common channel is used, and a pre-assign slot is assigned to each of the peripheral stations, the system comprising:

a means which is provided in the central station and which stores pre-assign slot information of each of the peripheral stations;

a means which is provided in the central station and which multiplexes slot assign information to be changed at a next frame over the pre-assign slot information; and a means which is provided in each of the peripheral stations and which, on receipt of the slot assign information, transmits the next frame using a slot assigned to itself.

In the slot assign system according to the invention, the central station transmits, to the peripheral stations, slot assign information based on the pre-assign information on a frame to frame basis and, for carrying out the transmission, the peripheral stations recognize their pre-assign slots based on their pre-assign information so that the slot assign information is centrally controlled by the central station. Thus, when a change is made therein, there is no need for the peripheral stations to be informed of such information by the central station, and the slot assign information can be changed without a need for cutting off the data link between the central station and the peripheral stations.

Also, according to the invention, the central station transmits DA (demand assign) information and the peripheral stations can make a reservation request based on the DA information. Then, using the next frame, the central station makes the DA slot assignment so that the DA slots can be effectively and efficiently used whereby the assignment is allowed to be made with flexibility with respect to traffic, the slot efficiency is enhanced, and any transmission delay at the peripheral stations can be minimized.

In the slot assign system according to the invention, since the central station transmits, to peripheral stations, slot assign information of the next frame on a frame by frame basis, the peripheral stations are not required to store their PA slot information. Each peripheral station can recognize its PA slot location from the slot assign information received, and can make the next transmission.

Also, since the DA slot assign information is transmitted from the central station to the peripheral stations, it is possible for each of the peripheral stations to make a reservation request for a DA slot and can make use of this DA slot.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENT OF THE INVENTION

Now, a preferred embodiment of the invention is explained with reference to the drawings.

Figure 2:
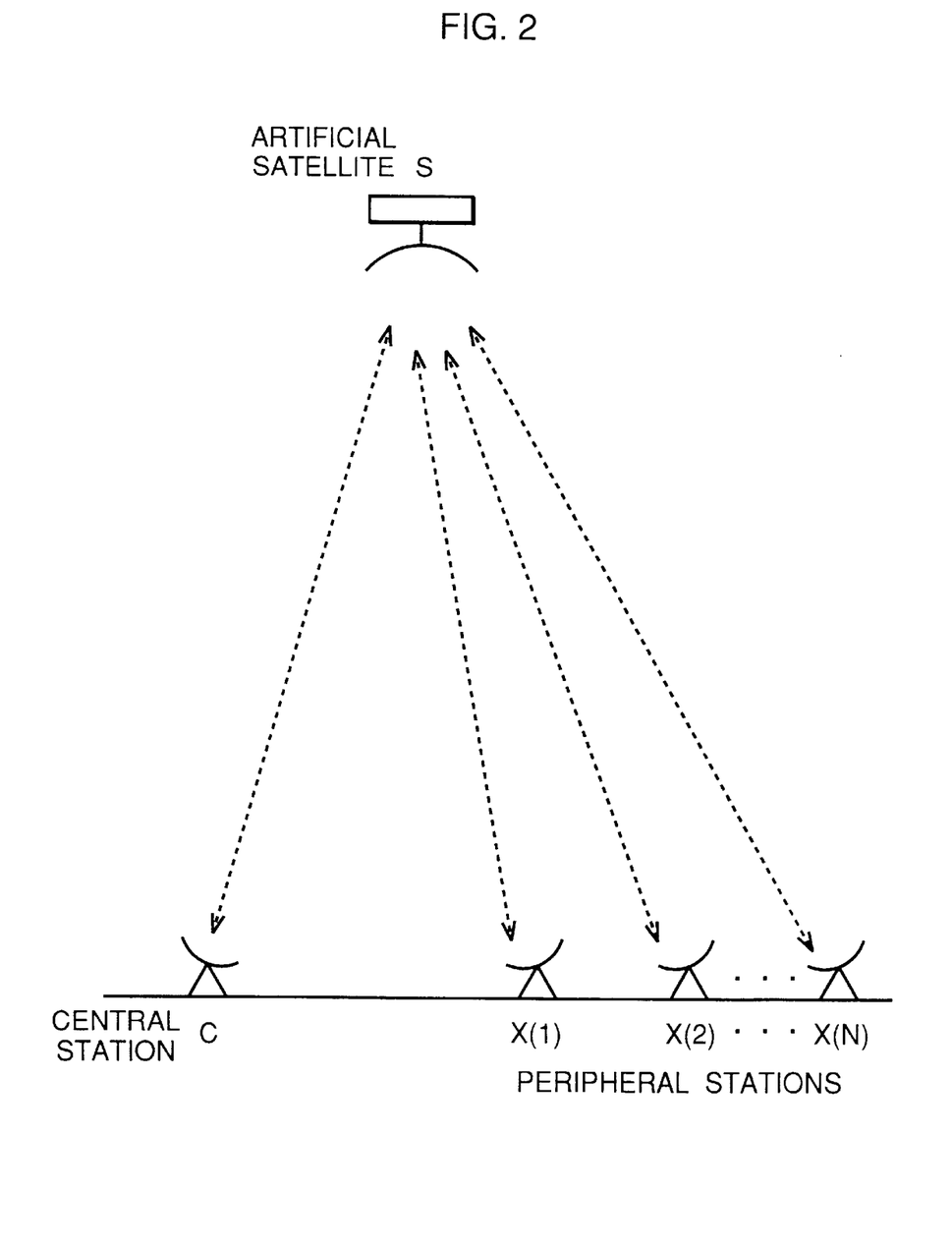
FIG. 2 is a schematic diagram showing a general concept of the satellite communication system to which the present invention is applied.

FIG. 2 shows, in a structural diagram, a satellite communication system to which the present invention is applied. The system is constituted by a central station C and a plurality of peripheral stations X(i) (i being integer numbers 1, 2, 3, . . . , N), and is configured such that the peripheral stations X have access to the central station C with a common channel being used through an artificial satellite S and are arranged for time division multiple access by slot divisions.

Figure 3:
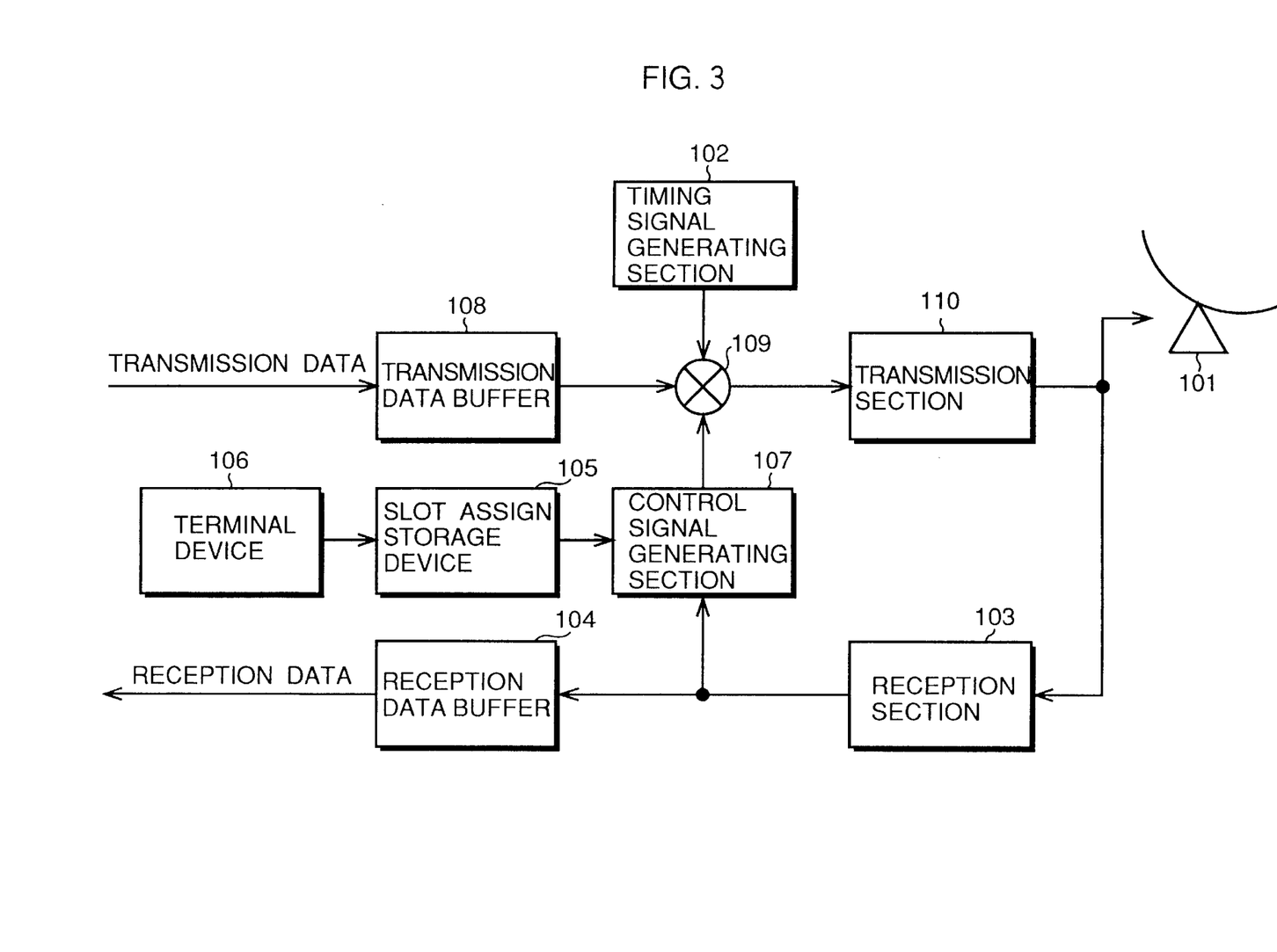
FIG. 3 is a block diagram showing a structure of the central station according to the present invention.

FIG. 3 is a block diagram showing a structure of the central station C, in which a transmission/reception section 101 transmits and receives radio waves to and from the artificial satellite S. A timing signal generating section 102 generates a predetermined number of slots, that is, timing signals indicating divisions of frames, in the transmission timing and the reception timing. A reception section 103 processes the received data, that is, the data received through the transmission/reception section 101 from the peripheral stations X via the artificial satellite S. A reception data buffer 104 receives and buffers an output of the reception section 103 so as to use it as a reception data.

A slot assign storage device 105 stores slot assign information. A terminal device 106 is used when the slot assign information stored in the storage device 105 is changed. A control signal generating section 107 outputs slot assign information based on the slot assign information of the slot assign storage device 105. The control signal generating section 107, if this also has a common function of making assignment by reservation, receives an output of the reception section 103, assigns the necessary number of slots for accommodating reservation requests from peripheral stations X, and sends such information to a multiplexing section 109.

Furthermore, a transmission data buffer 108 buffers the transmission data. The multiplexing section 109 receives outputs of the timing signal generating section 102, the control signal generating section 107 and the transmission data buffer 108, and multiplexes them by time division. A transmission section 110 receives an output of the multiplexing section 109 and sends it to the transmission/reception section 101 which in turn transmits the received data to the artificial satellites for each of the peripheral stations X.

Figure 4:
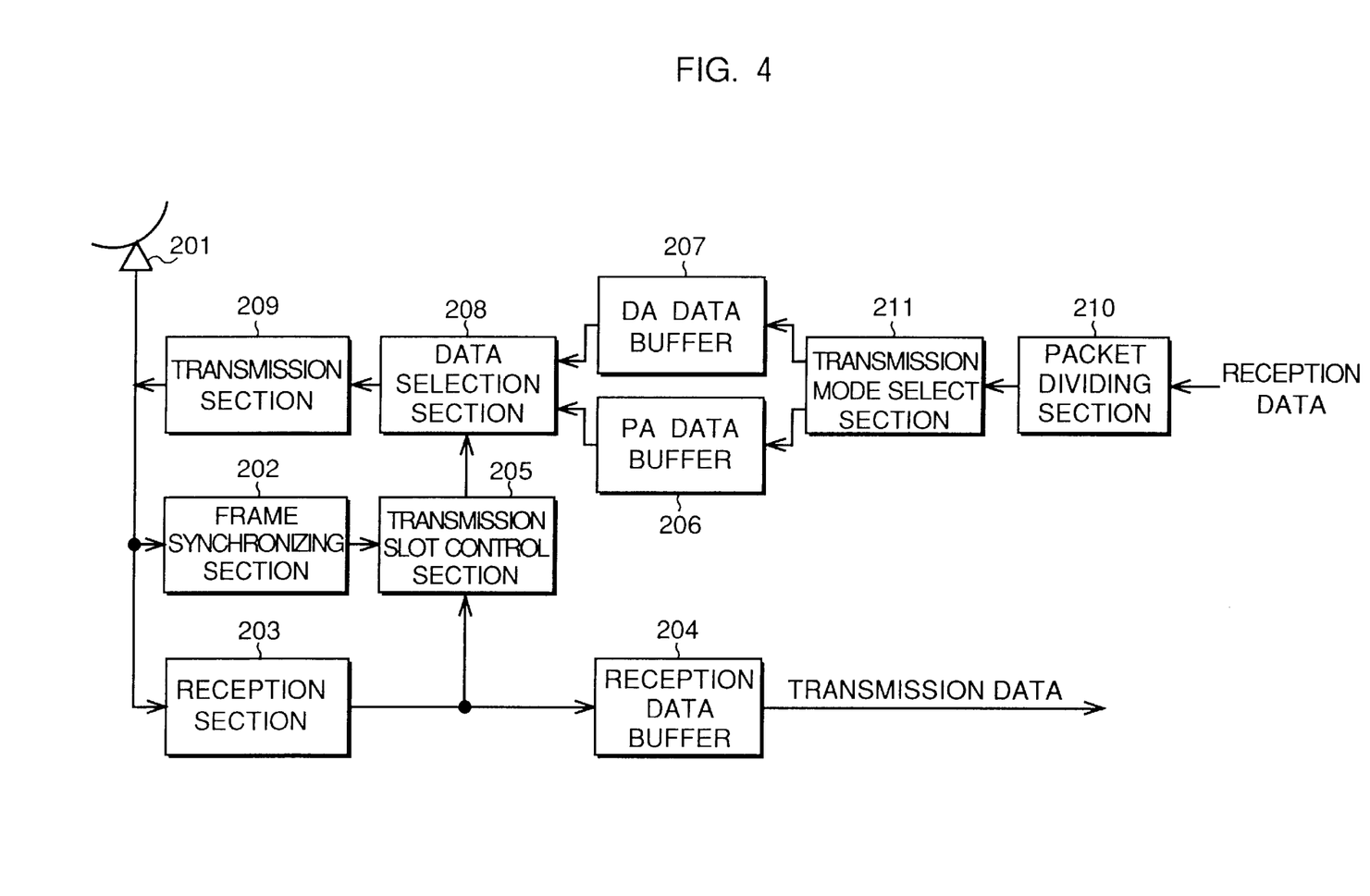
FIG. 4 is a block diagram showing a structure of the peripheral station according to the present invention.

FIG. 4 is a block diagram showing a structure of the peripheral station X, in which a transmission/reception section 201 transmits and receives radio waves to and from the artificial satellite S. In synchronization with a timing signal obtained by extracting it from a transmission data received from the central station C through the artificial satellite S by the transmission/reception section 201, a frame synchronizing section 202 calculates a slot timing and generates a slot timing signal. A reception section 203 divides the reception signal from the artificial satellite S, that is, from the central station C, into slot assign information and reception data. A reception data buffer 204 buffers the reception data to be divided by the reception section 203.

A transmission slot control section 205 receives an output of the frame synchronizing section 202 and generates a slot indicating signal which indicates the slot assigned in accordance with the slot assign information resulting from the division by the reception section 203. This slot indicating signal also includes information as to whether the slot assigned is a PA (pre-assign) slot or a DA (demand assign) slot. A PA data buffer buffers the data to be transmitted by the PA slot, and a DA data buffer 207 buffers the data to be transmitted by slots other than the PA slot. At the slot timing of the PA slot, a data selection section 208 inputs to a slot the data from the PA data buffer 206 based on the slot indicating signal generated by the transmission slot control section 205. However, if the PA data buffer is vacant, the data is inputted to the slot from the DA data buffer 207. A transmission section 209 carries out the data transmission by receiving an output of the data selection section 208.

Further, a packet dividing section 210 divides the data to be sent out into a packet of a length that can be accommodated in a single slot. If the data is divided into a plurality of packets, each leading packet is provided with information on the numbers of reservation requests in correspondence to the numbers of divided packets. A transmission mode select section 211 receives an output of the packet dividing section 210 and inputs it in the PA data buffer 206 in the case where the peripheral stations use only the PA slots or use both the PA slots and the DA slots for transmission, and outputs it to the DA data buffer 207 in the case where only the DA slots are used for transmission.

Figure 5A:
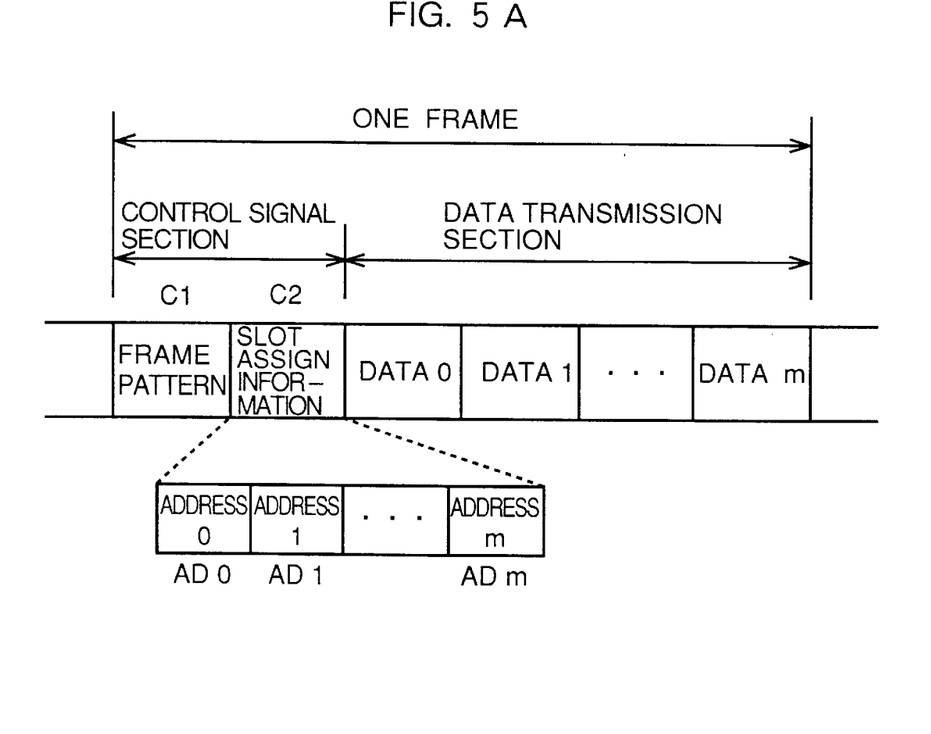
FIGS. 5A and 5B are diagrams showing an outbound signal format and an inbound signal format, respectively, in the embodiment according to the present invention.
Figure 5B:
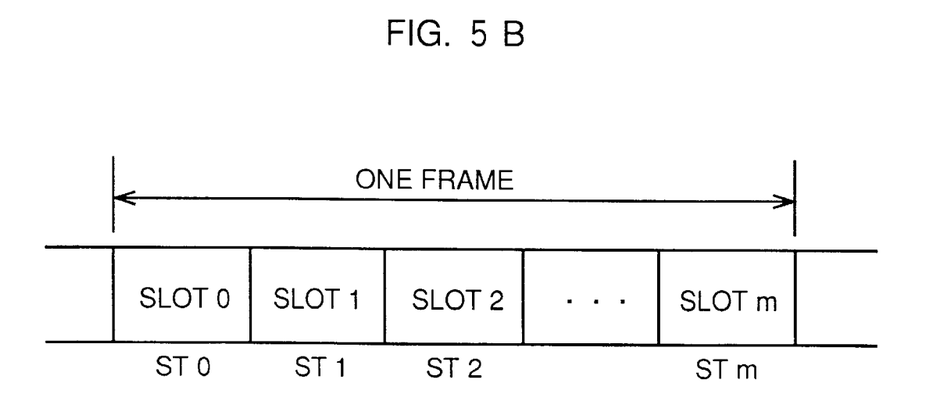

FIGS. 5A and 5B are, respectively, a format diagram for the outbound signals and that for the transmission signals (inbound signals) from the peripheral stations to the central station. The outbound signals shown in FIG. 5A are constituted by a control signal section and a data signal section. If the number of slots in one frame is assumed to be (m+1), the data signal section consists of data 0–data m. The control signal section consists of frame pattern C1 and slot assign information C2. In the slot assign information, there are written addresses ADj (j=0, 1, 2, . . . , m) of the number of peripheral stations that corresponds to the number of the slots contained in one frame. Each peripheral station X checks whether its own address is present in the address ADj and, if present, determines a position of the slot from its location in the slot assign information.

As shown in FIG. 5B, the inbound signals are divided into (m+1) slots such as slots STk (k=0, 1, 2, . . . , m).

Figure 6:
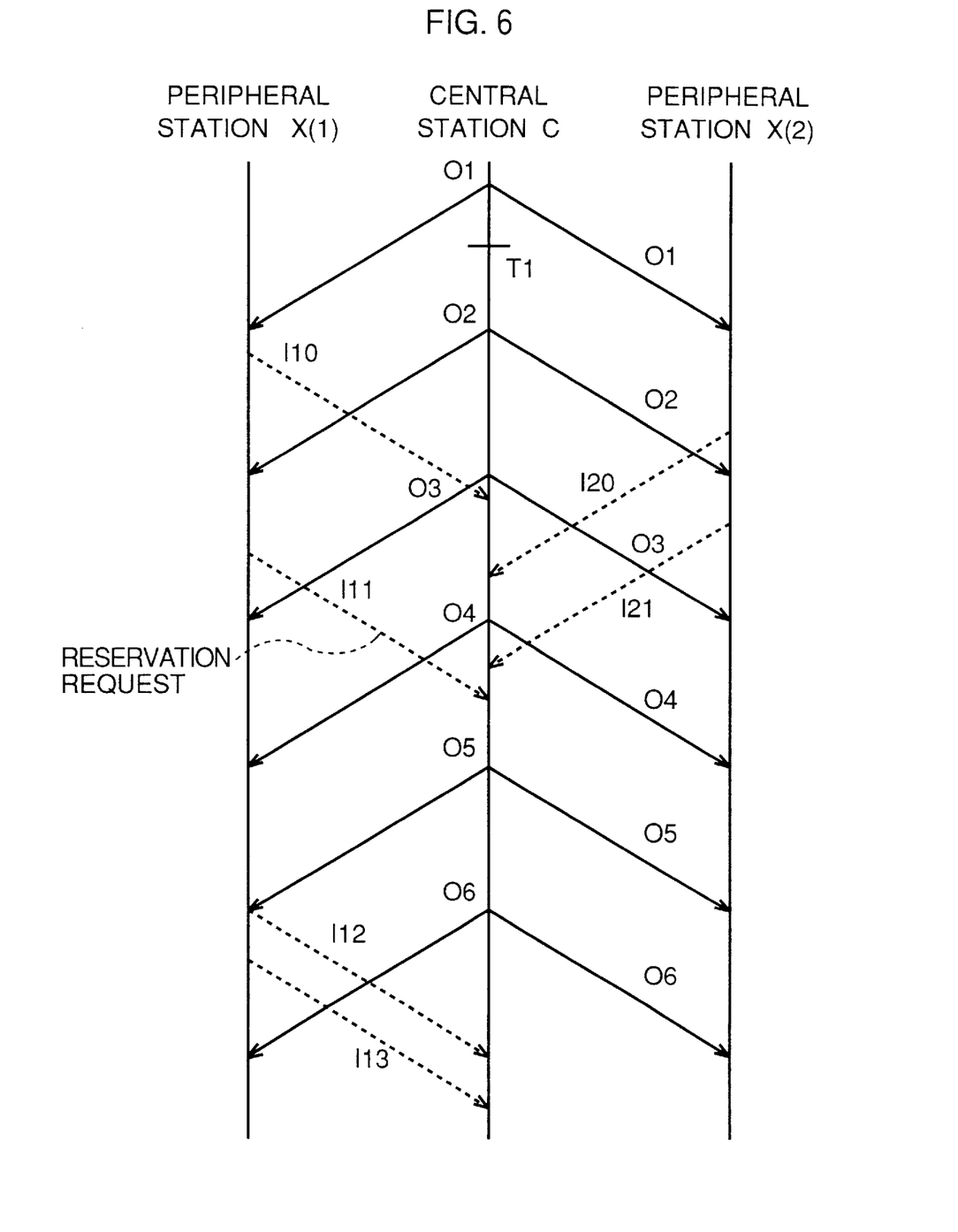
FIG. 6 is a timing chart showing a communication procedure using a conventional pre-assign system.

FIG. 6 is a diagram showing the procedure for assigning slots in the satellite communication system described above. Here it is assumed that, in the example of FIG. 2, the peripheral station X(2) is a station using only the PA slots, and the peripheral station X(1) is a station using both the PA slots and the DA slots or using only the DA slots. The outbound signals 01–06 from the central station to peripheral stations are transmitted at frame intervals, and each peripheral station X carries out slot synchronization based on cycles of the outbound signals.

The central station C holds PA information of each peripheral station X in the slot assign storage device 105 and, when the transmission is made, the outbound signal is provided with a portion in which the slot assign information of the next frame is written. In the slot assign information, the addresses of the peripheral stations assigned are written in the sequence of the slots as explained above. In this case, in the portion which indicates the slots not assigned to any of the peripheral stations (that is, a vacant slot with no pre-assignment), the addresses of the peripheral stations which do not exist are written (non-assign information signal).

Time T1 indicates the time when the PA slot information is changed at the central station C. The slot assign information at O1 transmitted to the peripheral station X from the central station C before the time T1 is written based on the PA information before the change. Since the central station carries out the transmission based on such information, the inbound signals from the peripheral stations X to the central station C are those generated based on the PA information before the change. In this case, since all the peripheral stations X are in the state before the change, it is also possible, as before, for the transmission I20 of the peripheral station X(2) to be carried out with the central station C.

After the time T1, the PA information has been changed and the slot assign information at O2 is written based on the PA information after the change, so that, based on such information, the peripheral station X(2) carries out the transmission I21. In this case, each peripheral station X watches the slot assign information at O2 and, if its own address is found, calculates the slot number from the location where it is found, and determines that the slot concerned in the next frame is the slot assigned to its own station, whereby the transmission is made using this slot. In this case, too, since all the peripheral stations X carry out transmission based on the changed slot assign, even when the change is made in the PA information, the transmission can continue without the data link being cut off. Also, when the PA information is changed again, there is no occurrence of cutting-off of the data link similarly as above.

In the case where the peripheral station X(1) is a station which carries out the transmission using both the PA slots and the DA slots, the transmission data of the peripheral station X(1) are all inputted to the PA data buffer 206 by the transmission mode selection section 211. The peripheral station X(1) is informed at O2 that the PA slot assigned to its own station is the next frame and, thus, carries out the transmission using the slot thus assigned.

Where a large volume of data is to be transmitted, the peripheral station that detects its DA slot from the slot numbers carries out communication I11 using the slot assigned to this station with a slot assign reservation request added thereto. Based on the reservation request made by this inbound signal I11, the central station C makes a slot assignment with respect to the DA slot and, at O5, informs the peripheral stations of the information concerning the slot assignment based on the PA information and of the information concerning the assignment by reservation. The peripheral station X(1) carries out communications I12 and I13 using the DA slot based on the above information.

Where the peripheral station X(1) is a station which uses only the DA slots, the data sent from the peripheral station X(1) are all inputted to only the DA data buffer 207 by the transmission mode select section 211. The transmission is made using only the DA slots. If the reservation request is sent, as by I11, the reservation assignment slot is informed at O5. The PA data buffer 206 of the peripheral station X(1) is vacant so that the transmission by reservation is also made from the DA data buffer 207, and the communications I12 and I13 are carried out.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. A slot assign system for a communication network constituted by a central station and a plurality of peripheral stations, in which, through an artificial satellite, a communication from the central station to the peripheral stations is made in a broadcasting form using frames, a communication from the peripheral stations to the central station is made through a common channel time-divided into a plurality of slots, and a slot is assigned to each of the peripheral stations, said system comprising:

a means provided in said central station for storing slot assign information of each of said peripheral stations;

a means provided in said central station for time-multiplexing outgoing data together with updated slot assign information in each said frame without cutting off an existing data link;

a means provided in each of said peripheral stations for, on receipt of said updated slot assign information, transmitting a next said frame using a slot assigned to itself based on the undated slot assign information;

a means provided in said central station for sending a vacant slot which is not assigned to any of the peripheral stations;

a means provided in each of said peripheral stations for recognizing said vacant slot, and transmitting, using said slot assigned to itself, a reservation request for using said vacant slot; and a means provided in said central station for transmitting, in a frame following the reservation request, said updated slot assign information identifying said vacant slot to be used by the peripheral station issuing the reservation request.

2. A slot assign system according to claim 1, in which each of said peripheral stations is configured such that both an assigned said slot and said vacant slot are used and a reservation request for said vacant slot is made using said assigned slot.

3. A slot assign system according to claim 1, in which each of said peripheral stations is configured such that, when said vacant slot is recognized, a request for reservation for using said vacant slot is transmitted.

4. A slot assign system for a communication network constituted by a central station and a plurality of peripheral stations, in which, through an artificial satellite, a communication from the central station to the peripheral stations is made in a broadcasting form using frames, a communication from the peripheral stations to the central station is made through a common channel time-divided into a plurality of slots, and a slot is assigned to each of the peripheral stations, said system comprising:

a means provided in said central station for storing slot assign information of each of said peripheral stations;

a means provided in said central station for time-multiplexing outgoing data together with updated slot assign information in each said frame without cutting off an existing data link;

a means provided in each of said peripheral stations for, on receipt of said updated slot assign information, transmitting a next said frame using a slot assigned to itself based on the updated slot assign information;

wherein said central station comprises:

a storage means for storing current slot assign information with respect to each of said peripheral stations;

a control signal generating means for reading the current slot assign information from said storage means and generating a control signal including the updated slot assign information for each of said peripheral stations for each frame;

a multiplexing means for time-multiplexing the control signal together with outgoing data in each frame to produce a multiplexed signal; and     a first transmission means for transmitting the multiplexed signal to each of said peripheral stations; and wherein each of said peripheral stations comprises:

a frame synchronization means for generating a slot timing signal with synchronization being effected based on a the control signal in the multiplexed signal;

a transmission slot control means for detecting a slot assignment by extracting the updated slot assign information from said slot timing signal and generating a slot indicating signal in synchronization with said slot timing signal; and     a second transmission means for carrying out transmission in synchronization with said slot indicating signal.

* * * * *